United States Patent
Yu et al.

(10) Patent No.: US 10,624,172 B1
(45) Date of Patent: Apr. 14, 2020

(54) SHORT/OPEN PROTECTING CIRCUIT AND A METHOD THEREOF

(71) Applicant: Chengdu Monolithic Power Systems Co., Ltd., Chengdu (CN)

(72) Inventors: Bo Yu, Hangzhou (CN); Junxin Tan, Hangzhou (CN); Taofeng Li, Hangzhou (CN); Shufa Jiang, Hangzhou (CN); Li Yang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/586,707

(22) Filed: Sep. 27, 2019

(30) Foreign Application Priority Data

Oct. 9, 2018 (CN) .......................... 2018 1 1172807

(51) Int. Cl.
  *H05B 33/08* (2006.01)
(52) U.S. Cl.
  CPC .................................. *H05B 33/089* (2013.01)
(58) Field of Classification Search
  CPC .............. H05B 33/089; H05B 33/0884; H05B 33/0851; H05B 33/0887; H05B 33/0848; H05B 33/0815; G09G 3/3496; G09G 2330/08; H02M 1/32; H02M 3/156; H02M 2001/0025; Y02B 20/347
  See application file for complete search history.

(56) References Cited

U.S. PATENT DOCUMENTS

| | | | |
|---|---|---|---|
| 7,265,497 B2 | 9/2007 | Chen et al. | |
| 7,394,203 B2 | 7/2008 | Ren et al. | |
| 7,420,337 B2 | 9/2008 | Ren et al. | |
| 7,423,384 B2 | 9/2008 | Ren et al. | |
| 7,804,254 B2 | 9/2010 | Yao et al. | |
| 7,894,174 B2 | 2/2011 | Moyer et al. | |
| 8,063,570 B2 | 11/2011 | Zhang et al. | |
| 8,102,129 B2 | 1/2012 | Yao et al. | |
| 8,456,096 B2 * | 6/2013 | Kwok | H02M 1/32 315/219 |
| 8,981,666 B2 * | 3/2015 | Yu | G09G 3/3406 315/291 |
| 9,060,399 B2 * | 6/2015 | Lin | H05B 33/0815 |
| 9,084,330 B2 * | 7/2015 | Wolf | H05B 33/089 |
| 9,177,508 B2 * | 11/2015 | Kikuchi | H05B 33/0815 |
| 9,182,769 B2 * | 11/2015 | Yamaguchi | G05F 1/468 |
| 9,263,937 B2 | 2/2016 | Nguyen | |
| 10,021,754 B2 | 7/2018 | Kuang et al. | |
| 10,079,542 B2 | 9/2018 | Xiao et al. | |
| 2006/0049773 A1 | 3/2006 | Moyer et al. | |
| 2009/0027928 A1 | 1/2009 | Dong et al. | |
| 2010/0141149 A1 | 6/2010 | Liu et al. | |
| 2011/0002068 A1 | 1/2011 | Hu et al. | |
| 2011/0194214 A1 | 8/2011 | Yao et al. | |

* cited by examiner

*Primary Examiner* — Haissa Philogene
(74) *Attorney, Agent, or Firm* — Perkins Coie LLP (57) ABSTRACT

A short protecting circuit for a LED (Light-emitting Diode) driver for powering a plurality of LED strings, having: a short comparing circuit, configured to provide a plurality of short fault indicating signals; a first logic circuit, configured to provide a short fault signal based on the plurality of short fault indicating signals to indicate a short fault condition; a timing circuit, configured to provide a short protecting enable signal; and a second logic circuit, configured to provide a plurality of short isolating signals; wherein the short isolating signals are blocked when an open fault signal is valid.

19 Claims, 9 Drawing Sheets

SHORT/OPEN PROTECTING CIRCUIT AND A METHOD THEREOF

CROSS-REFERENCE TO RELATED APPLICATIONS

This application claims priority to and the benefit of Chinese Patent Application No. 201811172807.8, filed on Oct. 9, 2018, which is incorporated herein by reference in its entirety.

FIELD

The present invention relates generally to electronic circuits, and more particularly but not exclusively to short/open protecting circuits in LED (light-emitting diode) applications.

BACKGROUND

Figure 1:
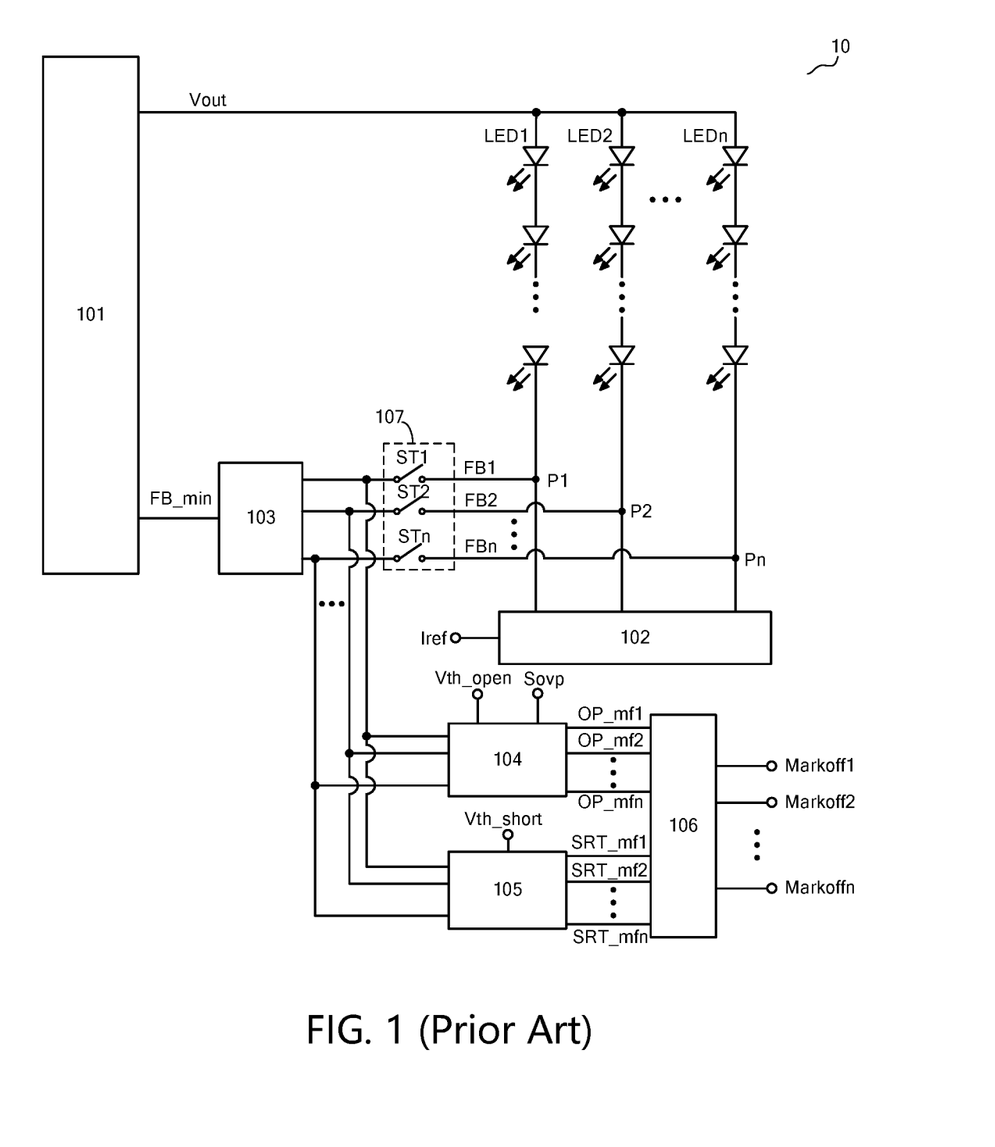
FIG. 1 schematically shows a prior art LED driver.

Today, LED backlighting is more and more widely adopted by monitors. For example, in LCD TV field, LED is tending to replace the traditional CCFL as the backlighting source. In backlighting applications, LEDs are arranged in multiple strings that are powered by a LED driver as shown in FIG. 1. In FIG. 1, the LED driver comprises: a voltage regulating circuit 101 configured to provide a power supply voltage Vout to the LED strings; and a current regulating circuit 102 configured to regulate each current flowing through an associated LED string of the plurality of LED strings. To provide a high enough voltage to the plurality of LED strings, the voltage regulating circuit 101 receives a plurality of feedback voltages FB1~FBn of the LED strings, and selects a minimum feedback voltage to control the power supply voltage Vout.

In a LED system, when short/open fault happens in any one of the LED strings, a protection mechanism is needed to process the faulted LED string to ensure the proper function of the rest of the LED strings.

When an open fault happens, the conventional way is to pull the faulted LED string to a ground reference. In that case, the minimum feedback voltage would be near zero. After a control loop regulation, the power supply voltage Vout increases to high enough to trigger the OVP (over voltage protection). As a result, the voltage regulator stops working, and meanwhile the faulted LED string is removed from the control loop. In this way, the LED open fault protection is realized. When a short fault happens, the feedback voltage of the shorted LED string increases to trigger the short fault protection. However, the feedback voltages FB1~FBn increase as the power supply voltage Vout increases when open fault happens too. The increase of the feedback voltage FB1~FBn caused by the open fault may mis-trigger the short fault protection.

In some cases, when short to ground fault happens, i.e., a LED string is shorted to ground reference, the power supply voltage Vout increases too with the same theory analyzed above. In these cases, the short to ground fault may be misjudged as the open fault.

SUMMARY

It is an object of the present invention to provide a fault handling mechanism used with the LED drivers.

In accomplishing the above and other objects, there has been provided, in accordance with an embodiment of the present invention, a short protecting circuit for a LED (Light-emitting Diode) driver powering a plurality of LED strings, comprising: a short comparing circuit, configured to receive a short threshold and a plurality of feedback voltages, and to provide a plurality of short fault indicating signals, wherein each feedback voltage indicates a voltage across an associated LED string of the plurality of LED strings, and wherein each short fault indicating signal is generated based on comparing the associated feedback voltage with the short threshold; a first logic circuit, configured to receive the plurality of short fault indicating signals, and to provide a short fault signal based on the plurality of short fault indicating signals to indicate a short fault condition, wherein the short fault signal is valid when at least one short fault indicating signal of the plurality of short fault indicating signals is valid; a timing circuit, configured to receive the short fault signal, and to provide a short protecting enable signal, wherein the short protecting enable signal is valid when the short fault signal indicates the short fault condition for a preset time period; and a second logic circuit, configured to receive the plurality of short fault indicating signals and the short protecting enable signal, and to provide a plurality of short isolating signals, wherein each short isolating signal is generated based on performing a logic operation to the short protecting enable signal and the associated short fault indicating signal of the plurality of short fault indicating signals; wherein the plurality of short isolating signals is blocked when an open fault signal is valid.

In accomplishing the above and other objects, there has been provided, in accordance with an embodiment of the present invention, an open and short to ground protecting circuit for a LED (Light-emitting Diode) driver for powering a plurality of LED string, comprising: an open comparing circuit, configured to receive an open threshold and a plurality of feedback voltages, and to provide a plurality of open fault indicating signals, wherein each feedback voltage indicates a voltage across an associated LED string of the plurality of LED strings, and wherein each open fault indicating signal is generated based on comparing the associated feedback voltage with the open threshold; a third logic circuit, configured to receive the plurality of open fault indicating signals and an OVP signal, and to provide a plurality of current isolating switch control signals and an open fault signal, wherein each current isolating switch control signal is generated based on performing a logic operation to the associated open fault indicating signal and the OVP signal, and the open fault signal is generated based on performing a logic operation to the plurality of open fault indicating signals, and wherein the OVP signal indicates if a power supply voltage provided to the plurality of LED strings is higher than an OVP threshold or not; a short to ground protecting circuit, configured to receive the plurality of feedback voltages, a short to ground threshold and the open fault signal, wherein when the open fault signal is valid, the short to ground circuit provides a short to ground indicating signal based on performing a logic operation to comparison results of each feedback voltage of the plurality of feedback voltages with the short to ground threshold; and a fourth logic circuit, configured to receive the short to ground indicating signal and the plurality of current isolating switch control signals, and to provide a plurality of feedback isolating switch control signals, wherein each feedback isolating switch control signal is generated based on performing a logic operation to the associated current isolating switch control signal and the short to ground indicating signal.

In accomplishing the above and other objects, there has been provided, in accordance with an embodiment of the present invention, a LED driver, comprising: a voltage regulating circuit, configured to provide a power supply voltage to a plurality of LED strings; a current regulating circuit, configured to receive a current regulating signal, wherein the current regulating circuit is coupled to the plurality of LED strings to regulate a current flowing through the LED string of plurality of LED strings based on the current regulating signal; a feedback selecting circuit, having a plurality of feedback isolating switches, wherein each feedback isolating switch is coupled to a connection node between the associated LED string of the plurality of LED strings and the current regulating circuit, and wherein the feedback selecting circuit receives a plurality of feedback voltages at the plurality of connection nodes, and to provide a minimum feedback voltage to the voltage regulating circuit, to regulate the power supply voltage; a short protecting circuit, configured to provide a plurality of short isolating signals, wherein each short isolating signal controls a connection between the associated LED string and the current regulating circuit, and wherein the short protecting circuit comprises: a short comparing circuit, configured to receive a short threshold and the plurality of feedback voltages, and to provide a plurality of short fault indicating signals, wherein each feedback voltage represents a voltage across an associated LED string of the plurality of LED strings, and wherein each short fault indicating signal is generated based on comparing the associated feedback voltage with the short threshold; a first logic circuit, configured to receive the plurality of short fault indicating signals, and to provide a short fault signal based on the plurality of short fault indicating signals to indicate a short fault condition, wherein the short fault signal is valid when at least one short fault indicating signal of the plurality of short fault indicating signals is valid; a timing circuit, configured to receive the short fault signal and an open fault signal, and to provide a short protecting enable signal, wherein the short protecting enable signal is valid when the short fault signal indicates the short fault condition for a preset time period; and a second logic circuit, configured to receive the plurality of short fault indicating signals and the short protecting enable signal, and to provide the plurality of short isolating signals, wherein each short isolating signal is generated based on performing a logic operation to the associated short fault indicating signal and the short protecting enable signal; wherein the plurality of short isolating signals is blocked when an open fault signal is valid.

BRIEF DESCRIPTION OF THE DRAWINGS

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

FIG. 1 schematically shows a prior art LED driver 10. The LED driver 10 comprises: the voltage regulating circuit 101, configured to provide the power supply voltage Vout to the plurality of LED strings; the current regulating circuit 102, configured to receive a current regulating signal Iref, and coupled to a plurality of feedback terminals P1~Pn to regulate a plurality of currents flowing through the associated LED strings; a feedback selecting circuit 103, configured to receive the plurality of feedback voltages FB1~FBn, and to provide a minimum feedback voltage FB_min with a minimum voltage value to the voltage regulating circuit 101, to regulate the power supply voltage Vout; an open protecting circuit 104, configured to receive the plurality of feedback voltages FB1~FBn, an open threshold Vth_open and an OVP signal Sovp, and to provide a plurality of open isolating signals OP_mf1~OP_mfn to the plurality of LED strings respectively; a short protecting circuit 105, configured to receive the plurality of feedback voltages FB1~FBn, a short threshold Vth_short, and to provide a plurality of short isolating signals SRT_mf1~SRT_mfn; and a logic circuit 106, configured to receive the plurality of open isolating signals OP_mf1~OPmfn, and the plurality of short isolating signals SRT_mf1~SRT_mfn, and to provide a plurality of string isolating signals Markoff1~Markoffn; wherein n is the number of the LED strings. The value of the open threshold Vth_open is near zero.

In FIG. 1, the logic circuit 106 performs a logic operation to each one of the plurality of open isolating signals OP_mf1~OP_mfn and the associated one of the plurality of short isolating signals SRT_mf1~SRT_mfn. For any single LED string LEDx, if one of the open isolating signal OP_mfx and the short isolating signal SRT_mfx is valid, which means there is an open fault or a short fault in the LED string, the associated isolating signal Markoffx is valid, and indicates to isolate the fault LED string, wherein any label suffixed by letter x represents the label of a signal or of a component associated with the LED string LEDx, and wherein x represents any one of the numbers between 1 and n. By isolating, it means that the fault LED string is disconnected from the current regulating circuit 102, and the associated feedback signal FBx is blocked.

In the example of FIG. 1, when the OVP signal Sovp is valid, i.e., the power supply voltage Vout is higher than an OVP threshold Vth_OVP, the voltage regulating circuit 101 stopes working until the power supply voltage Vout decreases below a value lower than the OVP threshold Vth_OVP.

As shown in FIG. 1, the LED driver further comprises a feedback control circuit 107. In normal operation, the plurality of feedback isolating switches ST1~STn in the feedback control circuit 107 are all turned on, so that the plurality of feedback voltages FB1~FBn all could be provided to the feedback selecting circuit 103. When any one of the LED string needs to be isolated, the associated isolating signal Markoffx turns off the associated feedback isolating switch STx, to cut off the associated feedback voltage FBx of the LED string LEDx from the control loop.

In the prior art LED driver in FIG. 1, when any one of the LED strings is open, a value of the associated feedback voltage FBx of that open LED string is near the value of the ground reference. The feedback selecting circuit 103 then selects the minimum feedback voltage FB_min with the minimum value, i.e., the feedback voltage FBx of the open LED string LEDx, to the voltage regulating circuit 101. The voltage regulating circuit 101 has a voltage regulating loop, which regulates the power supply voltage Vout based on the minimum feedback voltage FB_min. When the minimum feedback voltage FB_min decreases, the power supply voltage Vout is regulated to increase, vice versa. When the minimum feedback voltage FB_min decreases to the value of the ground reference, e.g., zero, the power supply voltage Vout is regulated to increase above the OVP threshold Vth_OVP, and the over voltage protection would be triggered. As a result, the voltage regulating circuit 101 stops working until the power supply voltage Vout decreases below a safe threshold. Meanwhile, the open LED string is isolated by the open protecting circuit 104 when the feedback voltage FBx of the open LED string is detected being lower than the open threshold Vth_open. The voltage regulating circuit 101 restarts after the power supply voltage decreases below the safe threshold.

When any one of the LED string LEDx is shorted, the feedback voltage FBx of the associated LED string increases due to the decreased voltage across the associated LED string. When the feedback voltage FBx increases to a short threshold Vth_short, the short fault protection is triggered. When the short fault condition maintains for a preset time period Tshort, the short protecting circuit provides the associated short isolating signal SRT_mfx to isolate the shorted LED string. By isolating, it means the short LED string is disconnected from the current regulating circuit 102, and the associated feedback voltage FBx is blocked, i.e., the associated feedback isolating switch STx in the feedback control circuit 107 is turned off. In one embodiment, the value of the short threshold Vth_short is 5V.

From the above illustration, it could be known that the power supply voltage Vout increases when an open fault protection is triggered. At this time, except for the feedback voltage FBx of the opened LED string, the feedback voltages FB1~FBn of the other LED strings increase as the power supply voltage Vout increases. If any one of the feedback voltages FB1~FBn reaches the short threshold Vth_short, the short fault protection may be mis-triggered, and then all the LED strings are isolated.

In some applications, a feedback terminal Px may be shorted to the ground reference. As shown in FIG. 1, when the feedback terminal Px is shorted to the ground reference, the minimum feedback voltage FB_min would be the value of the ground reference. Then the power supply voltage Vout increases, and may mis-trigger the over voltage protection. Meanwhile, an open fault protection may be mis-triggered too because the low feedback voltage value of the fault LED string. Then the fault LED string is isolated by the open protecting circuit 104. However, the voltage regulating circuit 101 still be working normally after the short to ground LED string is isolated. It should be noted that isolating the fault LED string is realized by disconnecting the fault LED string from the current regulating circuit 102 and blocking the associated feedback voltage. When the LED string is shorted to the ground reference, the LED string is still connected to the power supply voltage in a shorted way when the LED string is isolated. Thus, if the voltage regulating circuit 101 keeps working, then a current flowing through the short to ground LED string increases rapidly, and may shoot through the short to ground LED string, and the voltage regulating circuit 101 would be damaged too.

Thus, there is a need to identify the different faults, and to deal with the different faults correctly.

Figure 2:
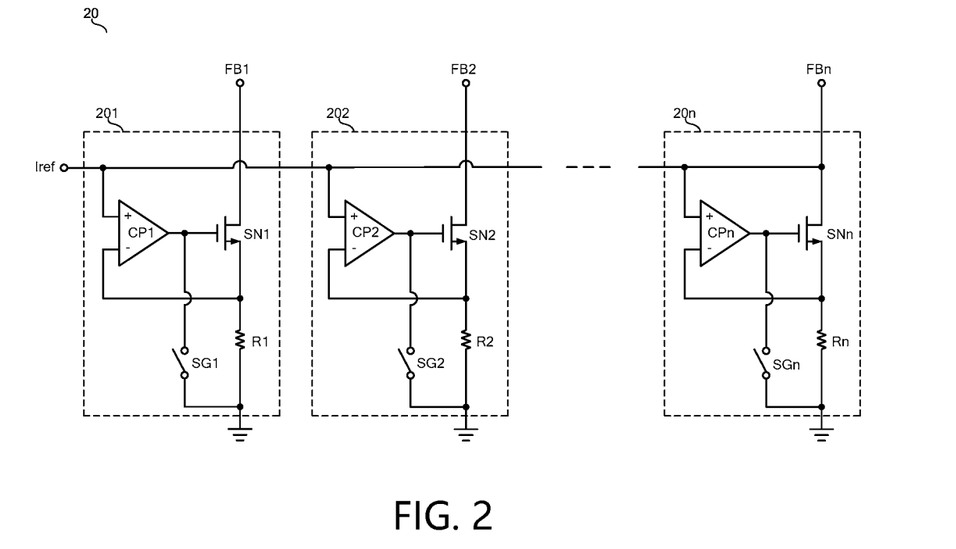
FIG. 2 schematically shows a current regulating circuit 102 in accordance with an embodiment of the present invention.

FIG. 2 schematically shows a current regulating circuit 20 in accordance with an embodiment of the present invention. The current regulating circuit 20 may be used with the LED driver shown in FIG. 1. As shown in FIG. 2, the current regulating circuit 20 comprises n control units 201~20n configured to control n LED strings respectively, wherein each control unit 20x comprises a current control switch SNx, a resistor Rx and an amplifying circuit CPx, wherein any label suffixed by letter x represents the label of a signal or of a component associated with the LED string LEDx, and wherein x represents any one of the numbers between 1 and n. The current regulating signal Iref regulates a current flowing through a current control switch SNx, i.e, the current flowing through the associated LED string, by adjusting an output of an associated amplifying circuit CPx. An associated current isolating switch SGx is coupled between the output of the amplifying circuit CPx and a ground reference. When the LED string LEDx needs to be isolated, the associated current isolating switch SGx is turned on by the associated isolating signal Markoffx, and a control terminal of the associated current control switch SNx is pulled to the ground reference to turn off the associated current control switch SNx, to disconnect the associated LED string LEDx from the current regulating circuit 20.

Figure 3:
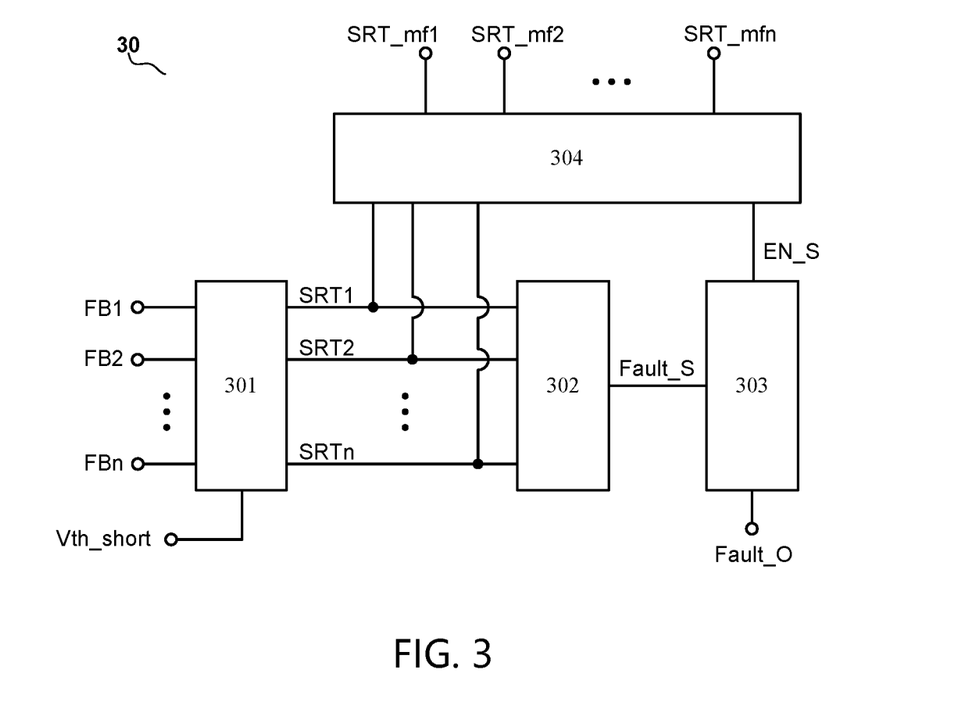
FIG. 3 schematically shows a short protecting circuit 30 in accordance with an embodiment of the present invention.

FIG. 3 schematically shows a short protecting circuit 30 in accordance with an embodiment of the present invention. As shown in FIG. 3, the short protecting circuit 30 comprises: a short comparing circuit 301, configured to receive the plurality of feedback voltages FB1~FBn and the short threshold Vth_short, and to provide the plurality of short fault indicating signals SRT1~SRTn, wherein each short fault indicating signal is generated based on comparing the associated feedback voltage with the short threshold Vth_short; a first logic circuit 302, configured to receive the plurality of short fault indicating signals SRT1~SRTn, and to provide a short fault signal Fault_S based on the plurality of short fault indicating signals SRT1~SRTn to indicate a short fault condition, wherein when one of the short fault indicating signals SRT1~SRTn is valid (the short fault happens), the short fault signal Fault_S is valid; a timing circuit 303, configured to receive the short fault signal Fault_S and an open fault signal Fault_O, and to provide a short protecting enable signal EN_S based on the short fault signal Fault_S and the open fault signal Fault_O, wherein the short protecting enable signal EN_S is valid when the short fault signal Fault_S indicates the short fault condition for a preset time period Tshort, in the premise that the open fault signal Fault_O is invalid; and a second logic circuit 304, configured to receive the plurality of short fault indicating signals SRT1~SRTn and the short protecting enable signal EN_S, and to provide the plurality of short isolating signals SRT_mf1~SRT_mfn, wherein each short isolating signal is generated based on performing a logic operation to the associated short fault indicating signal and the short protecting enable signal EN_S.

In one embodiment, the short comparing circuit 301 comprises n comparators, wherein each comparator is configured to receive the short threshold Vth_short and one feedback voltage of the plurality of feedback voltages FB1~FBn, and to provide each short fault indicating signal based on the associated feedback voltage and the short threshold Vth_short. When a feedback voltage FBx is higher than the short threshold Vth_short, the associated short fault indicating signal SRTx is valid, which indicates that the associated LED string LEDx is shorted, wherein any label suffixed by letter x represents the label of a signal or of a component associated with the LED string LEDx, and wherein x represents any one of the numbers between 1 and n.

In one embodiment, a short fault indicating signal's valid state is represented by high level voltage, and the first logic circuit 302 comprises an OR gate. When any one of the short fault indicating signal SRTx turns high, the short fault signal Fault_S provided by the first logic circuit 302 goes high, i.e., be valid, and indicates there is a shorted LED string. It should be understood that, when the valid state of a short fault indicating signal is represented by other voltage levels, the structure of the first logic circuit 302 would be changed accordingly. For example, when the valid state of the short fault indicating signal is represented by low level voltage, the first logic circuit 302 may comprise an AND gate, and the valid state of the short fault signal is the low level voltage then. When the valid state of the short fault indicating signal is represented by the low level voltage, the first logic circuit 302 may also comprise a NAND gate, and then the valid state of the short fault signal Fault_S is high level voltage. The examples here are to illustrate the variability of the short fault indicating signals SRT1~SRTn and the first logic circuit 302. Any circuit could implement the function of the first logic circuit 302 descried here could be used with the present invention.

In FIG. 3, the timing circuit 303 is configured to receive the short fault signal Fault_S and the open fault signal Fault_O. When the open fault signal Fault_O is invalid but the short fault signal Fault_S is valid, the timing circuit 303 starts working, and provides the short protecting enable signal EN_S, wherein the short protecting enable signal EN_S turns valid when the valid state of the short fault signal Fault_S maintains for the time period Tshort. When the open fault signal Fault_O is valid, no matter the short fault signal Fault_S is valid or not, the timing circuit 303 does not work, and the short protecting enable signal EN_S is invalid in this situation.

In one embodiment, the second logic circuit 304 comprises a plurality of AND gates, wherein each AND gate receives the short protecting enable signal EN_S and the associated short fault indicating signal SRTx, and wherein based on the short protecting enable signal EN_S and the associated short fault indicating signals SRTx, each AND gate provides an associated short isolating signal SRT_mfx. It should be understood that when the valid state of the plurality short fault indicating signals SRT1~SRTn, the short protecting enable signal EN_S or the plurality of short isolating signals SRT_mf1~SRT_mfn is represented by other voltage levels, the structure of the second logic circuit 304 would be changed accordingly.

Figure 4:
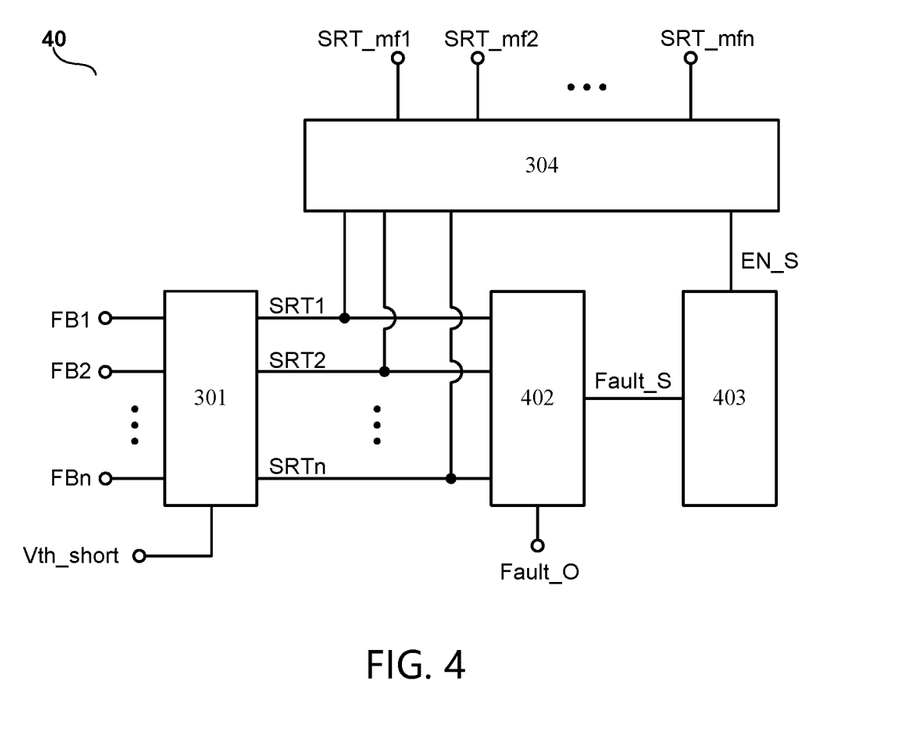
FIG. 4 schematically shows a short protecting circuit 40 in accordance with an embodiment of the present invention.

FIG. 4 schematically shows a short protecting circuit 40 in accordance with an embodiment of the present invention. As shown in FIG. 4, the short protecting circuit 40 comprises: the short comparing circuit 301, configured to receive the plurality of feedback voltages FB1~FBn and the short threshold Vth_short, and to provide the plurality of short fault indicating signals SRT1~SRTn, wherein each short fault indicating signal is generated based on comparing the associated feedback voltage with the short threshold Vth_short; a first logic circuit 402, configured to receive the plurality of short fault indicating signals SRT1~SRTn and the open fault signal Fault_O, and to provide the short fault signal Fault_S based on the plurality of short fault indicating signals SRT1~SRTn and the open fault signal Fault_O to indicate the short fault condition; a timing circuit 403, configured to receive the short fault signal Fault_S, and to provide a short protecting enable signal EN_S, wherein the short protecting enable signal EN_S is valid when the short fault signal Fault_S indicates the short fault condition for the preset time period Tshort; the second logic circuit 304, configured to receive the plurality of short fault indicating signals SRT1~SRTn and the short protecting enable signal EN_S, and to provide the plurality of short isolating signals SRT_mf1~SRT_mfn, wherein each short isolating signal is generated based on performing a logic operation to the associated short fault indicating signal and the short protecting enable signal EN_S.

The difference between the short protecting circuit 40 in FIG. 4 and the short protecting circuit 30 in FIG. 3 is that: the open fault signal Fault_O is provided to the first logic circuit 402 instead of the timing circuit 303. When the open fault signal Fault_O is valid, i.e., at least one LED string is opened, the plurality of short fault indicating signals SRT1~SRTn are blocked by the first logic circuit 402. In the example of FIG. 4, the high level voltage of any one of the short fault indicating signals SRT1~SRTn indicates a short fault, and the low level voltage of the open fault signal Fault_O indicates an open fault. Based on this situation, the first logic circuit 402 comprises two AND gates, wherein a first AND gate receives all of the plurality of short fault indicating signals SRT1~SRTn, and a second AND gate receives the open fault signal Fault_O and an output signal of the first AND gate. In another embodiment, the high level voltage of the short fault indicating signal indicates a short fault, and the high level voltage of the open fault signal Fault_O indicates an open fault. Based on this situation, the open fault signal Fault_O is inverted before AND operation. It should be understood that when the valid state of input signals of the first logic circuit 402 is represented by other voltage levels, the structure of the first logic circuit 402 would be changed accordingly.

Figure 5:
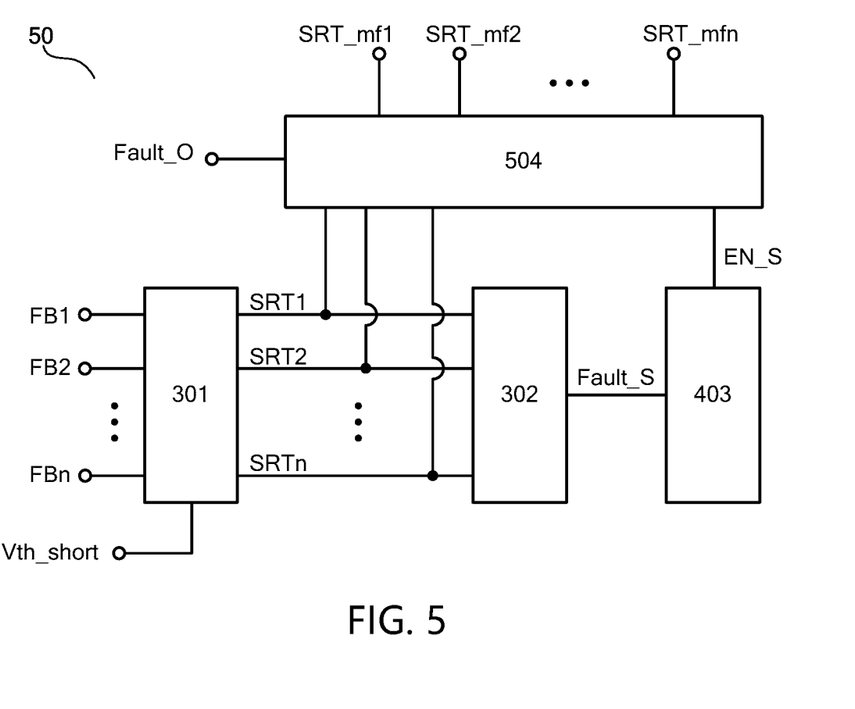
FIG. 5 schematically shows a short protecting circuit 50 in accordance with an embodiment of the present invention.

FIG. 5 schematically shows a short protecting circuit 50 in accordance with an embodiment of the present invention. As shown in FIG. 5, the short protecting circuit 50 comprises: the short comparing circuit 301, configured to receive the plurality of feedback voltages FB1~FBn and the short threshold Vth_short, and to provide the plurality of short fault indicating signals SRT1~SRTn, wherein each short fault indicating signal is generated based on comparing the associated feedback voltage with the short threshold Vth_short; the first logic circuit 302, configured to receive the plurality of short fault indicating signals SRT1~SRTn, and to provide a short fault signal Fault_S based on the plurality of short fault indicating signals SRT1~SRTn to indicate the short fault condition, wherein when one of the short fault indicating signals SRT1~SRTn is valid (the short fault happens), the short fault signal Fault_S is valid; the timing circuit 403, configured to receive the short fault signal Fault_S, and to provide the short protecting enable signal EN_S, wherein the short protecting enable signal EN_S is valid when the short fault signal Fault_S indicates the short fault condition for the preset time period Tshort; a second logic circuit 504, configured to receive the plurality of short fault indicating signals SRT1~SRTn, the open fault signal Fault_O and the short protecting enable signal EN_S, and to provide the plurality of short isolating signals SRT_mf1~SRT_mfn, wherein each short isolating signal is generated based on performing a logic operation to the associated short fault indicating signal and the short protecting enable signal EN_S, and wherein the plurality of short fault indicating signals are blocked when the open fault signal Fault_O is valid. That is to say, the short isolating signals SRT_mf1~SRT_mfn are invalid when the open fault signal Fault_O is valid, regardless of the states of the short fault indicating signal SRT1~SRTn.

Figure 6:
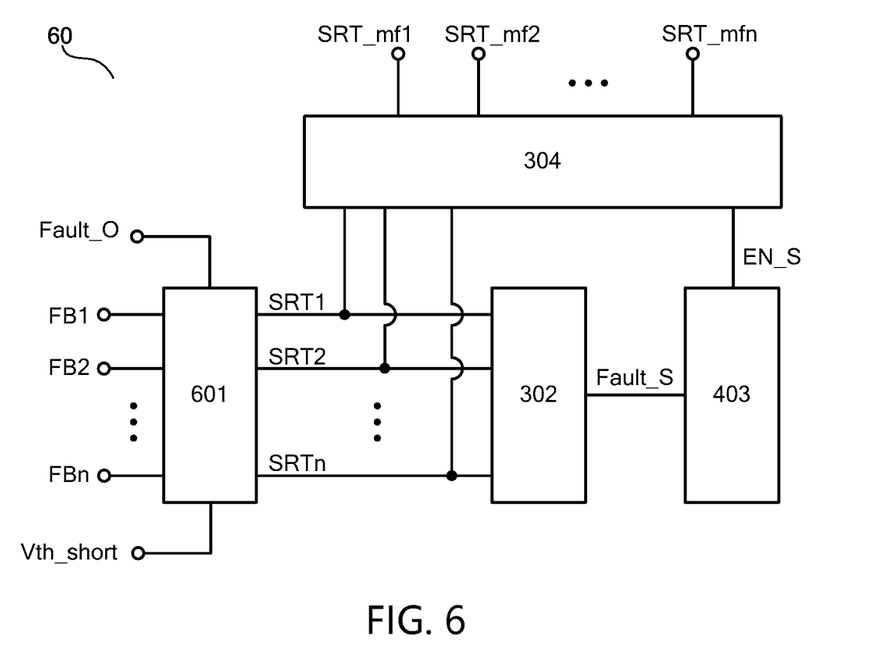
FIG. 6 schematically shows a short protecting circuit 60 in accordance with an embodiment of the present invention.

FIG. 6 schematically shows a short protecting circuit 60 in accordance with an embodiment of the present invention. As shown in FIG. 6, the short protecting circuit 60 comprises: a short comparing circuit 601, configured to receive the plurality of feedback voltages FB1~FBn, the short threshold Vth_short and the open fault signal Fault_O, and to provide the plurality of short fault indicating signals SRT1~SRTn, wherein each short fault indicating signal is generated based on comparing the associated feedback voltage with the short threshold Vth_short, and wherein the short comparing circuit 601 is disabled when the open fault signal Fault_O is valid; the first logic circuit 302, configured to receive the plurality of short fault indicating signals SRT1~SRTn, and to provide a short fault signal Fault_S based on the plurality of short fault indicating signals SRT1~SRTn to indicate the short fault condition, wherein when one of the short fault indicating signals SRT1~SRTn is valid (the short fault happens), the short fault signal Fault_S is valid; the timing circuit 403, configured to receive the short fault signal Fault_S, and to provide the short protecting enable signal EN_S, wherein the short protecting enable signal EN_S is valid when the short fault signal Fault_S indicates the short fault condition for the preset time period Tshort; the second logic circuit 304, configured to receive the short fault indicating signals SRT1~SRTn and the short protecting enable signal EN_S, and to provide the short isolating signals SRT_mf1~SRT_mfn based on the logic operation of the short fault indicating signals SRT1~SRTn and the short protecting enable signal EN_S.

In FIG. 6, when the open fault signal Fault_O is valid, i.e., an open fault condition, the short comparing circuit 601 is disabled, otherwise, the short comparing circuit 601 is enabled.

Figure 7:
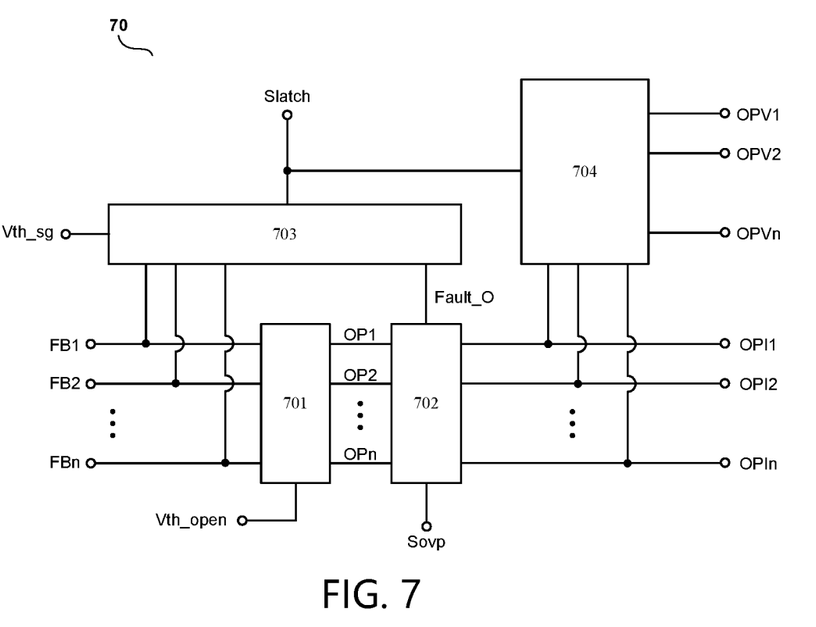
FIG. 7 schematically shows an open and short to ground protecting circuit 70 in accordance with an embodiment of the present invention.

FIG. 7 schematically shows an open and short to ground protecting circuit 70 in accordance with an embodiment of the present invention. As shown in FIG. 7, the open and short to ground protecting circuit 70 comprises: an open comparing circuit 701, configured to receive the plurality of feedback voltages FB1~FBn and the open threshold Vth_open, and to provide the plurality of open fault indicating signals OP1~OPn, wherein each open fault indicating signal is generated based on comparing the associated feedback voltage with the open threshold Vth_open; a third logic circuit 702, configured to receive the plurality of open fault indicating signals OP1~OPn and the OVP signal Sovp, and to provide a plurality of current isolating switch control signals OPI1~OPIn and the open fault signal Fault_O, wherein each current isolating switch control signal is generated based on performing a logic operation to the associated open fault indicating signal and the OVP signal Sovp, and wherein the open fault signal Fault_O is generated based on performing a logic operation to the plurality of open fault indicating signals OP1~OPn; a short to ground protecting circuit 703, configured to receive the plurality of feedback voltages FB1~FBn, a short to ground threshold Vth_sg and the open fault signal Fault_O, wherein in the premise that the open fault signal Fault_O is valid, the short to ground protecting circuit 703 provide a short to ground indicating signal Slatch based on performing a logic operation to comparison results of each feedback voltage of the plurality of feedback voltages with the short to ground threshold; and a fourth logic circuit 704, configured to receive the short to ground indicating signal Slatch and the plurality of current isolating switch control signals OPI1~OPIn, and to provide a plurality of feedback isolating switch control signals OPV1~OPVn, wherein each feedback isolating switch control signal is generated based on performing a logic operation to the associated current isolating switch control signal with the short to ground indicating signal Slatch.

In FIG. 7, the open comparing circuit 701 compares each one of the plurality of feedback voltages FB1~FBn with the open threshold Vth_open, and provides the plurality of open fault indicating signals OP1~OPn to indicate if there is any feedback voltage FBx being lower than the open threshold Vth_open, wherein any label suffixed by letter x represents the label of a signal or of a component associated with the LED string LEDx, and wherein x represents any one of the numbers between 1 and n.

In one embodiment, the third logic circuit 702 receives the plurality of open fault indicating signals OP1~OPn, and performs a logic operation to each one of the open fault indicating signals OP1~OPn with the OVP signal Sovp, e.g., AND operation, and then provides the plurality of current isolating switch control signals OPI1~OPIn based on the logic operation results respectively. When the OVP signal Sovp indicates that the power supply voltage Vout is higher than the OVP threshold Vth_OVP, and meanwhile one of the open fault indicating signal OPx indicates that the feedback voltage FBx is lower than the open threshold Vth_open, the associated current isolating switch control signal OPIx turns on the associated current isolating switch SGx. As a result, the associated current control switch SNx is turned off, and the associated string LEDx is disconnected from the current regulating circuit 102. Also, a logic operation is performed to all of the plurality of current isolating switch control signals OPI1~OPIn, and the open fault signal Fault_O is generated based on the logic operation result. To be specific, when one of the plurality of current isolating switch control signal OPIx is valid, i.e., the current isolating switch control signal OPIx is going to turn on the associated current isolating switch SGx, the open fault signal Fault_O is valid.

As illustrated before, a valid open fault signal Fault_O doesn't necessary mean there is an open LED string. A short to ground fault condition needs to be excluded. In one embodiment, the short to ground protecting circuit 703 comprises a comparing circuit and a logic circuit. The open fault signal Fault_O is adopted as an enable signal of the short to ground protecting circuit 703. The comparing circuit of the short to ground protecting circuit 703 compares each one of the plurality of feedback voltages FB1~FBn with the short to ground threshold Vth_sg, and provides a plurality of comparing results. The logic circuit of the short to ground protecting circuit 703 performs a logic operation to all of the plurality of comparing results to generate the short to ground indicating signal Slatch. When any one of the plurality of comparing results indicates that one of the plurality of feedback voltages is lower than the short to ground threshold Vth_sg, the short to ground indicating signal Slatch is valid, indicating that there is a LED string being shorted to the ground. Then the short to ground indicating signal Slatch latches the LED driver until restarted.

The fourth logic circuit 704 receives the short to ground indicating signal Slatch and the plurality of current isolating switch control signals OPI1~OPIn, and performs a logic operation to each one of the plurality of current isolating switch control signals OPI1~OPIn with the short to ground indicating signal Slatch. When the short to ground indicating signal Slatch is invalid, the plurality of current isolating switch control signals OPI1~OPIn are provided as the plurality of feedback isolating switch control signals OPV1~OPVn to control the plurality of feedback isolating switches ST1~STn in the feedback control circuit 107 respectively, i.e., the current isolating switch control signal OPIx, which turns on the associated current isolating switch SGx, turns off the associated feedback isolating switch STx, to block the associated feedback voltage FBx. When the short to ground indicating signal Slatch is valid, which means there is a LED string shorted to the ground, the plurality of feedback isolating switch control signals OPV1~OPVn turn off all of the plurality of feedback isolating switches ST1~STn in the feedback control circuit 107.

In one embodiment, the OVP signal Sovp is generated by an over voltage protecting circuit which may comprise a comparator, wherein the comparator receives the power supply voltage Vout and the OVP threshold Vth_ovp, and provides the OVP signal Sovp based on a comparison result of the power supply voltage Vout and the OVP threshold Vth_ovp. The detail of the over voltage protecting circuit is not shown in the drawings for brevity.

The present invention involves several logic circuits. Persons of ordinary skill in the art should know that the logic circuits may change according to the forms of the input/output signals. The logic circuits in the present invention are illustrated as examples. Persons of ordinary skill in the art could adopt the proper logic circuits in accordance with the application in the light of the present invention.

Figure 8:
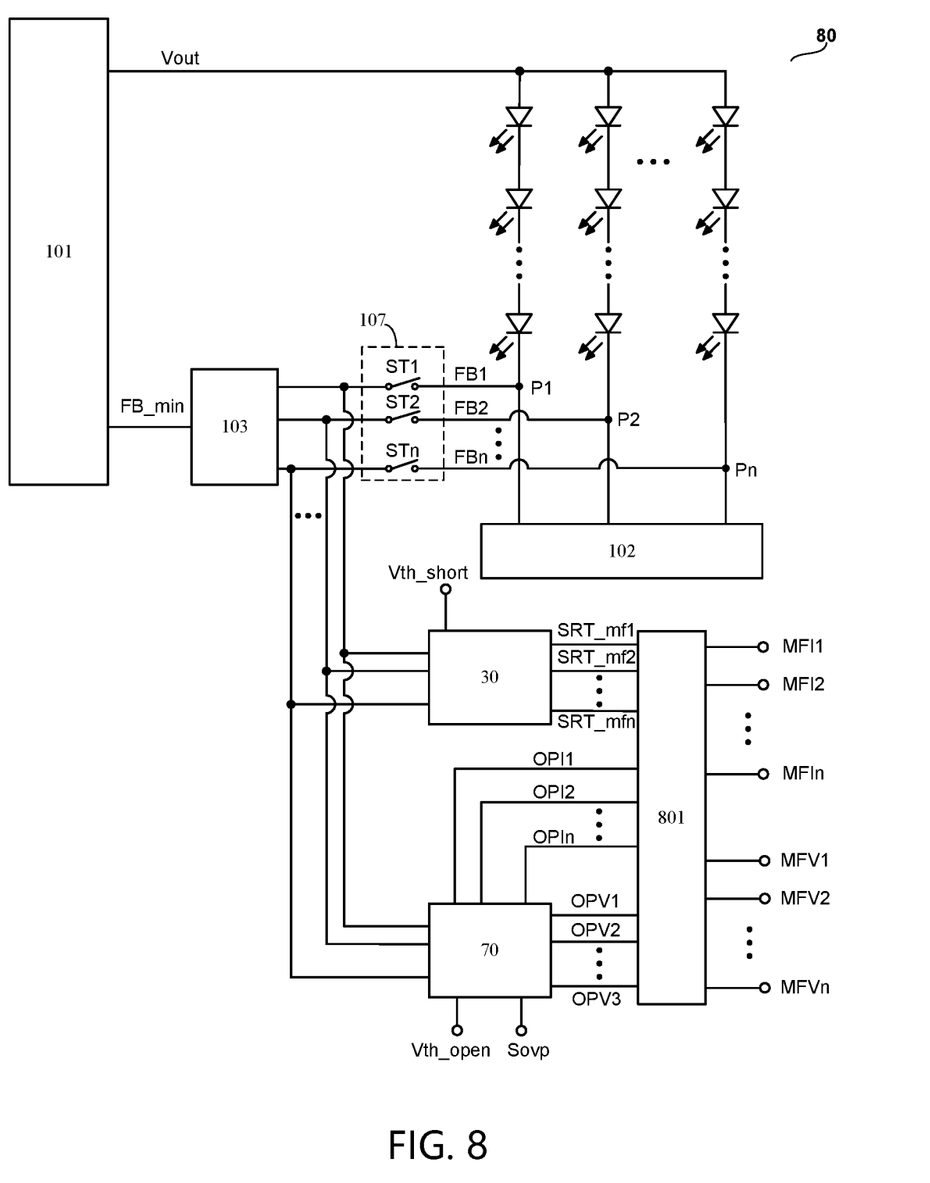
FIG. 8 schematically shows a LED driver 80 in accordance with an embodiment of the present invention.

FIG. 8 schematically shows a LED driver 80 in accordance with an embodiment of the present invention. The LED driver 80 comprises: the voltage regulating circuit 101, configured to provide the power supply voltage Vout to the plurality of LED strings; the current regulating circuit 102, configured to receive the current regulating signal Iref, wherein the current regulating circuit 102 is coupled to the plurality of LED strings to regulate a current flowing through a LED string of the plurality of LED strings based on the current regulating signal Iref; the feedback selecting circuit 103, configured to receive the plurality of feedback voltages FB1~FBn, and to provide the minimum feedback voltage FB_min to the voltage regulating circuit 101 to regulate the power supply voltage Vout; the open and short to ground protecting circuit 70, configured to receive the plurality of feedback voltages FB1~FBn, the open threshold Vth_open and the OVP signal Sovp, and to provide the plurality of short isolating signals SRT_mf1~SRT_mfn based on the plurality of feedback voltages FB1~FBn, the open threshold Vth_open and the OVP signal Sovp; the short protecting circuit 30, configured to receive the plurality of feedback voltages FB1~FBn and the short threshold Vth_short, and to provide the plurality of short isolating signals SRT_mf1~SRT_mfn based on the plurality of feedback voltages FB1~FBn and the short threshold Vth_short; and an isolating logic circuit 801, configured to receive the plurality of short isolating signals SRT_mf1~SRT_mfn, the plurality of current isolating switch control signals OPI1~OPIn and the plurality of feedback isolating switch control signals OPV1~OPVn, and to perform a logic operation to each one of the plurality of short isolating signals SRT_mf1~SRT_mfn and the associated one of the plurality of corresponding current isolating switch control signals OPI1~OPIn, wherein based on each logic operation result of the plurality of logic operation results, the isolating logic circuit 801 provides the associated one of the plurality of control signal MFI1~MFIn to the associated one of the plurality of current control switch SN1~SNn. Furthermore, the isolating logic circuit 801 performs a logic operation to the short isolating signal of the plurality of short isolating signals SRT_mf1~SRT_mfn and the associated feedback isolating switch control signal of the plurality of feedback isolating switch control signals OPV1~OPVn, wherein based on each one of the plurality of logic operation results, the isolating logic circuit 801 provides a control signal of the plurality of control signals MFV1~MFVn to the associated feedback isolating switch of the plurality of feedback isolating switches ST1~STn.

In one embodiment, the isolating logic circuit 801 comprises a plurality of logic gates. For example, the isolating logic circuit 801 may comprise a set of n AND gates, wherein each AND gate receives the short isolating signal SRT_mfx of the short isolating signals and the associated current isolating switch control signal OPIx, and provides the associated control signal MFIx to control the associated current control switch SNx based on performing AND operation to the short isolating signal SRT_mfx and the associated current isolating switch control signal OP Ix, wherein any label suffixed by letter x represents the label of a signal or of a component associated with the LED string LEDx, and wherein x represents any one of the numbers between 1 and n. Meanwhile, the isolating logic circuit 801 further comprises another set of n AND gates, wherein each AND gate receives the short isolating signal of the plurality of short isolating signals SRT_mfx and the associated feedback isolating switch control signal OPVx, and provides the control signal MFVx to control the associated feedback isolating switch STx based on performing the AND operation to the short isolating signal SRT_mfx and the associated feedback isolating switch control signal OPVx. Persons of ordinary skill in the art should know that the structure of the isolating logic circuit 801 may change according to the signal forms of the switch control signals.

It should be understood that the short protecting circuit 30 in FIG. 8 could be replaced by the short protecting circuit 40 in FIG. 4, the short protecting circuit 50 in FIG. 5 or the short protecting circuit 60 in FIG. 6.

Figure 9:
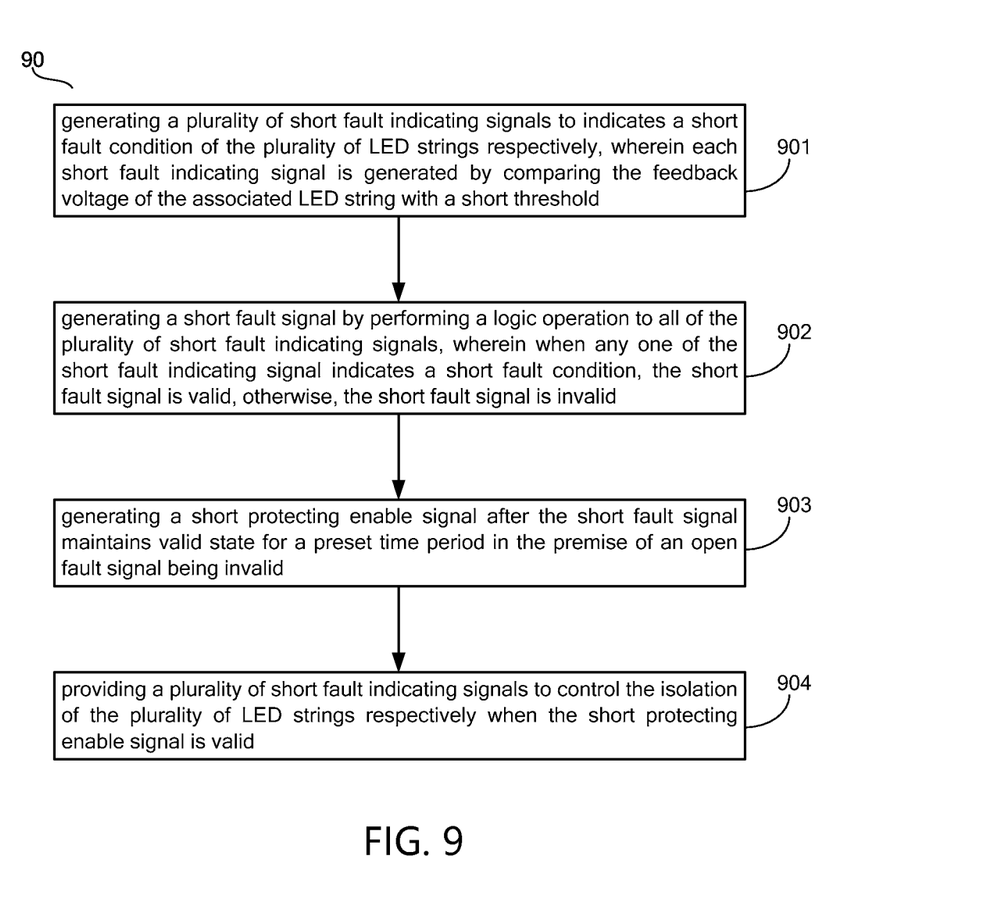
FIG. 9 schematically shows a control method 90 of processing LED strings faults.

FIG. 9 schematically shows a control method 90 of processing faults of the plurality of LED strings. The plurality of LED strings are powered by the voltage regulating circuit 101 as shown in FIG. 1, and the currents flowing through each one of the plurality of LED strings are regulated by the current regulating circuit 102 as shown in FIG. 1. The control method 90 comprises: step 901, generating a plurality of short fault indicating signals to indicates a short fault condition of the plurality of LED strings respectively, wherein each short fault indicating signal is generated by comparing the feedback voltage of the associated LED string with a short threshold; step 902, generating a short fault signal by performing a logic operation to all of the plurality of short fault indicating signals, wherein when any one of the short fault indicating signal indicates a short fault condition, the short fault signal is valid, otherwise, the short fault signal is invalid; step 903, generating a short protecting enable signal after the short fault signal maintains valid state for a preset time period in the premise of an open fault signal being invalid; and step 904, providing a plurality of short fault indicating signals to control the isolation of the plurality of LED strings respectively when the short protecting enable signal is valid.

In one embodiment, step 904 comprises: adopting the plurality of short fault indicating signals to control the transmission of the plurality of feedback voltages of the LED strings respectively; and adopting the plurality of short fault indicating signals to control the connections between the plurality of LED strings and the current regulating circuit respectively.

Figure 10:
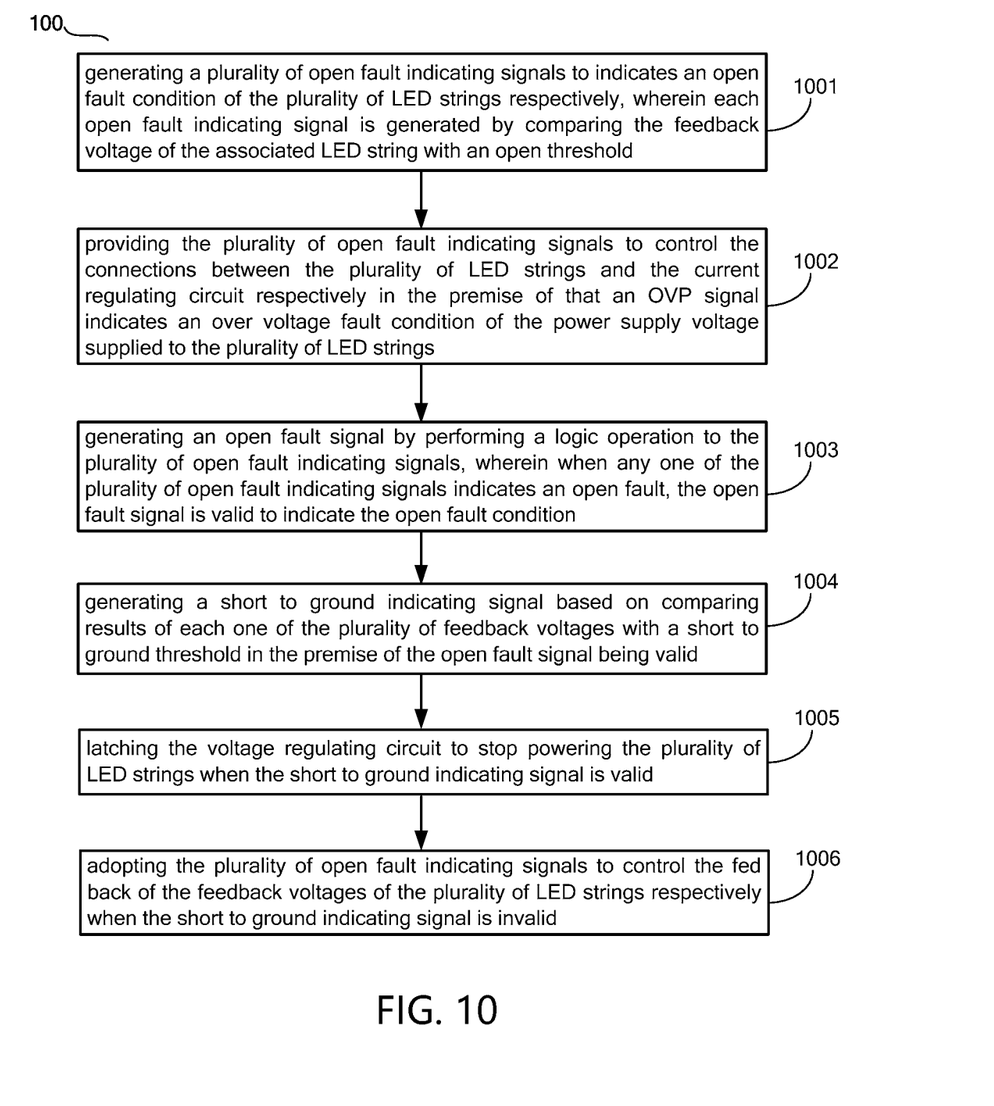
FIG. 10 schematically shows a control method 100 of processing LED strings faults.

FIG. 10 schematically shows a control method 100 of processing faults of the plurality of LED strings. The plurality of LED strings are powered by the voltage regulating circuit 101 as shown in FIG. 1, and the currents flowing through each one of the plurality of LED strings are regulated by the current regulating circuit 102 as shown in FIG. 1. The control method 100 comprises: step 1001, generating a plurality of open fault indicating signals to indicates an open fault condition of the plurality of LED strings respectively, wherein each open fault indicating signal is generated by comparing the feedback voltage of the associated LED string with an open threshold; step 1002, providing the plurality of open fault indicating signals to control the connections between the plurality of LED strings and the current regulating circuit respectively in the premise of that an OVP signal indicates an over voltage fault condition of the power supply voltage supplied to the plurality of LED strings; step 1003, generating an open fault signal by performing a logic operation to the plurality of open fault indicating signals, wherein when any one of the plurality of open fault indicating signals indicates an open fault, the open fault signal is valid to indicate the open fault condition; step 1004, generating a short to ground indicating signal based on comparing results of each one of the plurality of feedback voltages with a short to ground threshold in the premise of the open fault signal being valid; step 1005, latching the voltage regulating circuit to stop powering the plurality of LED strings when the short to ground indicating signal is valid; and step 1006, adopting the plurality of open fault indicating signals to control the fed back of the feedback voltages of the plurality of LED strings respectively when the short to ground indicating signal is invalid.

In one embodiment, when the OVP signal is valid, i.e., the power supply voltage Vout is higher than the OVP threshold Vth_OVP, the voltage regulating circuit 101 stops working until the power supply voltage drops below the safe threshold.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A short protecting circuit for a LED (Light-emitting Diode) driver powering a plurality of LED strings, comprising:
   a short comparing circuit, configured to receive a short threshold and a plurality of feedback voltages, and to provide a plurality of short fault indicating signals, wherein each feedback voltage indicates a voltage across an associated LED string of the plurality of LED strings, and wherein each short fault indicating signal is generated based on comparing the associated feedback voltage with the short threshold;
   a first logic circuit, configured to receive the plurality of short fault indicating signals, and to provide a short fault signal based on the plurality of short fault indicating signals to indicate a short fault condition, wherein the short fault signal is valid when at least one short fault indicating signal of the plurality of short fault indicating signals is valid;
   a timing circuit, configured to receive the short fault signal, and to provide a short protecting enable signal, wherein the short protecting enable signal is valid when the short fault signal indicates the short fault condition for a preset time period; and
   a second logic circuit, configured to receive the plurality of short fault indicating signals and the short protecting enable signal, and to provide a plurality of short isolating signals, wherein each short isolating signal is generated based on performing a logic operation to the short protecting enable signal and the associated short fault indicating signal of the plurality of short fault indicating signals; wherein
   the plurality of short isolating signals is blocked when an open fault signal is valid.

2. The short protecting circuit of claim 1, wherein the short comparing circuit further receives the open fault signal, and wherein the short comparing circuit is disabled when the open fault signal indicates an open fault condition.

3. The short protecting circuit of claim 1, wherein the timing circuit further receives the open fault signal, and wherein the timing circuit is disabled when the open fault signal indicates an open fault condition.

4. The short protecting circuit of claim 1, wherein the first logic circuit further receives the open fault signal, and wherein the short fault indicating signals are blocked and the short fault signal is invalid when the open fault signal indicates an open fault condition.

5. The short protecting circuit of claim 1, wherein the second logic circuit further receives the open fault signal, and wherein the short isolating signals are blocked when the open fault signal indicates an open fault condition.

6. The short protecting circuit of claim 1, further comprising:
   an open comparing circuit, configured to receive the plurality of feedback voltages and an open threshold, and to provide a plurality of open fault indicating signals, wherein each open fault indicating signal is generated based on comparing the associated feedback voltage with the open threshold;
   a third logic circuit, configured to receive the plurality of open fault indicating signals and an OVP signal, and to provide a plurality of current isolating switch control signals and the open fault signal, wherein each current isolating switch control signal is generated based on performing a logic operation to the associated open fault indicating signal and the OVP signal, and the open fault signal is generated based on performing a logic operation to the plurality of current isolating switch control signals, and wherein the OVP signal indicates if a power supply voltage provided to the LED strings is higher than an OVP threshold or not.

7. An open and short to ground protecting circuit for a LED (Light-emitting Diode) driver for powering a plurality of LED string, comprising:
- an open comparing circuit, configured to receive an open threshold and a plurality of feedback voltages, and to provide a plurality of open fault indicating signals, wherein each feedback voltage indicates a voltage across an associated LED string of the plurality of LED strings, and wherein each open fault indicating signal is generated based on comparing the associated feedback voltage with the open threshold;
- a third logic circuit, configured to receive the plurality of open fault indicating signals and an OVP signal, and to provide a plurality of current isolating switch control signals and an open fault signal, wherein each current isolating switch control signal is generated based on performing a logic operation to the associated open fault indicating signal and the OVP signal, and the open fault signal is generated based on performing a logic operation to the plurality of open fault indicating signals, and wherein the OVP signal indicates if a power supply voltage provided to the plurality of LED strings is higher than an OVP threshold or not;
- a short to ground protecting circuit, configured to receive the plurality of feedback voltages, a short to ground threshold and the open fault signal, wherein when the open fault signal is valid, the short to ground circuit provides a short to ground indicating signal based on performing a logic operation to comparison results of each feedback voltage of the plurality of feedback voltages with the short to ground threshold; and
- a fourth logic circuit, configured to receive the short to ground indicating signal and the plurality of current isolating switch control signals, and to provide a plurality of feedback isolating switch control signals, wherein each feedback isolating switch control signal is generated based on performing a logic operation to the associated current isolating switch control signal and the short to ground indicating signal.

8. The open and short to ground protecting circuit of claim 7, further comprising:
- an over voltage protecting circuit, configured to receive the OVP threshold and the power supply voltage for powering the plurality of LED strings, and to provide the OVP signal based on a comparison result of the power supply voltage with the OVP threshold.

9. A LED driver, comprising:
- a voltage regulating circuit, configured to provide a power supply voltage to a plurality of LED strings;
- a current regulating circuit, configured to receive a current regulating signal, wherein the current regulating circuit is coupled to the plurality of LED strings to regulate a current flowing through the LED string of plurality of LED strings based on the current regulating signal;
- a feedback selecting circuit, having a plurality of feedback isolating switches, wherein each feedback isolating switch is coupled to a connection node between the associated LED string of the plurality of LED strings and the current regulating circuit, and wherein the feedback selecting circuit receives a plurality of feedback voltages at the plurality of connection nodes, and to provide a minimum feedback voltage to the voltage regulating circuit, to regulate the power supply voltage;
- a short protecting circuit, configured to provide a plurality of short isolating signals, wherein each short isolating signal controls a connection between the associated LED string and the current regulating circuit, and wherein the short protecting circuit comprises:
  - a short comparing circuit, configured to receive a short threshold and the plurality of feedback voltages, and to provide a plurality of short fault indicating signals, wherein each feedback voltage represents a voltage across an associated LED string of the plurality of LED strings, and wherein each short fault indicating signal is generated based on comparing the associated feedback voltage with the short threshold;
  - a first logic circuit, configured to receive the plurality of short fault indicating signals, and to provide a short fault signal based on the plurality of short fault indicating signals to indicate a short fault condition, wherein the short fault signal is valid when at least one short fault indicating signal of the plurality of short fault indicating signals is valid;
  - a timing circuit, configured to receive the short fault signal and an open fault signal, and to provide a short protecting enable signal, wherein the short protecting enable signal is valid when the short fault signal indicates the short fault condition for a preset time period; and
  - a second logic circuit, configured to receive the plurality of short fault indicating signals and the short protecting enable signal, and to provide the plurality of short isolating signals, wherein each short isolating signal is generated based on performing a logic operation to the associated short fault indicating signal and the short protecting enable signal; wherein the plurality of short isolating signals is blocked when an open fault signal is valid.

10. The LED driver of claim 9, wherein the short comparing circuit further receives the open fault signal, and wherein the short comparing circuit is disabled when the open fault signal indicates an open fault condition.

11. The LED driver of claim 9, wherein the timing circuit further receives the open fault signal, and wherein the timing circuit is disabled when the open fault signal indicates an open fault condition.

12. The LED driver of claim 9, wherein the first logic circuit further receives the open fault signal, and wherein the plurality of short fault indicating signals are blocked and the short fault signal is invalid when the open fault signal indicates an open fault condition.

13. The LED driver of claim 9, wherein the second logic circuit further receives the open fault signal, and wherein the short isolating signals are blocked when the open fault signal indicates open fault.

14. The LED driver of claim 9, wherein the current regulating circuit comprises a plurality of control units, and wherein each control unit is coupled to the associated LED string, and wherein each control unit comprises:
- a current control switch, coupled in series with the associated LED string;
- a resistor, coupled between the current control switch and a ground reference;
- an amplifying circuit, having a first input terminal configured to receive the current regulating signal, a second input terminal coupled to a connection node of the current control switch and the resistor, and an output terminal coupled to a control terminal of the current control switch; and
- a current isolating switch, coupled between the output terminal of the amplifying circuit and the ground reference.

15. The LED driver of claim 14, further comprising:

an open comparing circuit, configured to receive the plurality of feedback voltages and an open threshold, and to provide a plurality of open fault indicating signals, wherein each open fault indicating signal is generated based on comparing the associated feedback voltage with the open threshold;

a third logic circuit, configured to receive the plurality of open fault indicating signals and an OVP signal, and to provide a plurality of current isolating switch control signals and the open fault signal, wherein each current isolating switch control signal is generated based on performing a logic operation to the associated open fault indicating signal and the OVP signal, and the open fault signal is generated based on performing a logic operation to the plurality of the open fault indicating signals, and wherein the OVP signal indicates if the power supply voltage is higher than an OVP threshold or not.

16. The LED driver of claim 15, further comprising:

an isolating logic circuit, configured to receive the plurality of short isolating signals, and the plurality of current isolating switch control signals, and to provide a plurality of control signals to the plurality of current control switches respectively, wherein each control signal is generated based on performing a logic operation to the associated short isolating signal and the associated current isolating switch control signal.

17. The LED driver of claim 14, further comprising an open and short to ground protecting circuit, wherein the open and short to ground protecting circuit comprises:

an open comparing circuit, configured to receive the plurality of feedback voltages and an open threshold, and to provide a plurality of open fault indicating signals, wherein each open fault indicating signal is generated based on comparing the associated feedback voltage with the open threshold;

a third logic circuit, configured to receive the plurality of open fault indicating signals and an OVP signal, and to provide a plurality of current isolating switch control signals and the open fault signal, wherein each current isolating switch control signal is generated based on performing a logic operation to the associated open fault indicating signal and the OVP signal, and the open fault signal is generated based on performing a logic operation to the plurality of open fault indicating signals, and wherein the OVP signal indicates if a power supply voltage provided to the plurality of LED strings is higher than an OVP threshold or not;

a short to ground protecting circuit, configured to receive the plurality of feedback voltages, a short to ground threshold and the open fault signal, wherein when the open fault signal is valid, the short to ground circuit provides a short to ground indicating signal based on performing a logic operation to comparison results of each feedback voltage of the plurality of feedback voltages with the short to ground threshold; and a fourth logic circuit, configured to receive the short to ground indicating signal and the plurality of current isolating switch control signals, and to provide a plurality of feedback isolating switch control signals, wherein each feedback isolating switch control signal is generated based on performing a logic operation to the associated current isolating switch control signal and the short to ground indicating signal.

18. The LED string control circuit of claim 17, wherein the open and short to ground protecting circuit further comprises:

an over voltage protecting circuit, configured to receive the OVP threshold and the power supply voltage, and to provide the OVP signal based on a comparison result of the power supply voltage and the OVP threshold.

19. The LED string control circuit of claim 17, further comprising:

an isolating logic circuit, configured to receive the plurality of short isolating signals, and the plurality of feedback isolating switch control signals, and to provide a plurality of control signals to the plurality of feedback isolating switches respectively, wherein each control signal is generated based on performing a logic operation to the associated short isolating signal and the associated feedback isolating switch control signal.

* * * * *